Patented May 11, 1926.

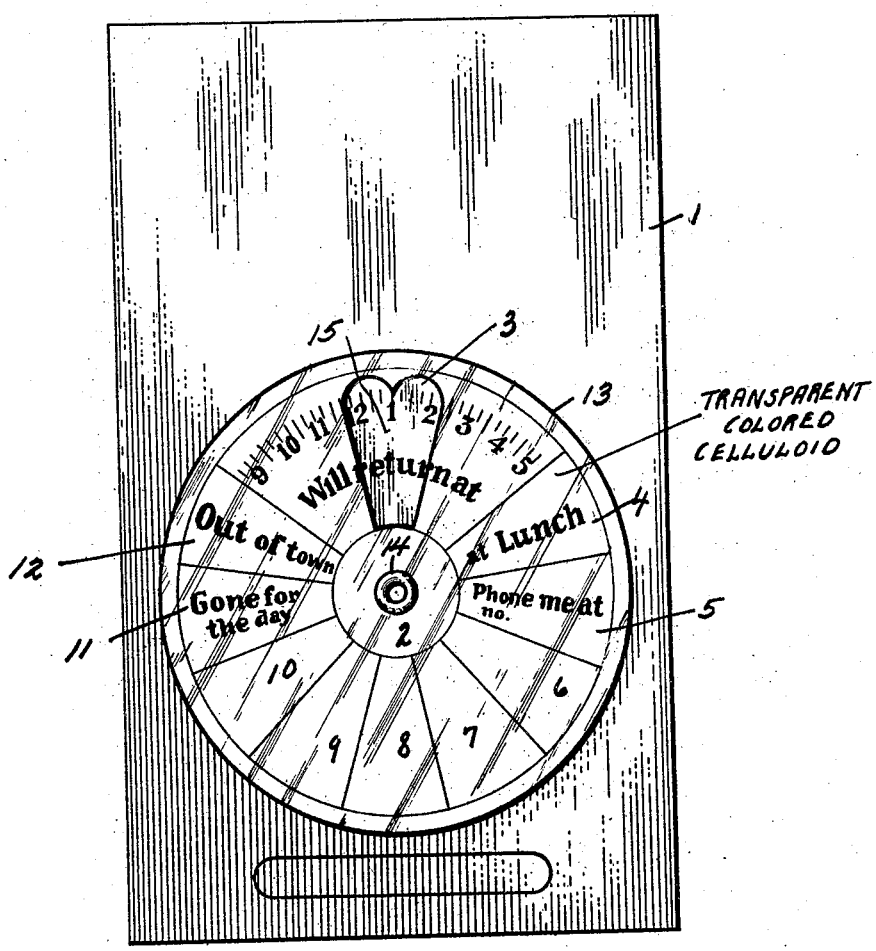

1,584,559

UNITED STATES PATENT OFFICE.

FRED H. KROGER, OF BROOKLYN, NEW YORK, ASSIGNOR TO AMERICAN ART WORKS, OF COSHOCTON, OHIO.

MONITOR.

Application filed November 11, 1924. Serial No. 749,129.

This invention relates to improvements in monitors of the type used for calling attention to certain notations or directions inscribed thereon. The device particularly described and illustrated herein is a monitor for office use bearing notations for conveying certain common messages to visitors. Although a monitor of this type is selected for purposes of illustration my invention is not limited thereto as it may be readily adapted to other purposes without departing from the spirit of the invention.

In certain devices of the kind referred to movable strips are utilized in conjunction with a holder having an opening adapted to expose a desired notation. In others a rotatable indicator having an opening is rotated around an axis to expose a desired notation. Each of these has the disadvantage of requiring a search for the desired notation because the only notation visible is that which is under the opening.

One object of my invention is to eliminate this difficulty. Other objects of the invention are to provide an inexpensive and convenient arrangement.

In accordance with my invention all of the notations are visible but the desired notation is differentiated from the others by utilizing an indicator of incomplete transparency. The single figure of the drawing illustrates by way of example one form which my invention may assume. An ordinary inexpensive form of monitor in accordance with the invention consists of a sheet 1 of stiff material such as cardboard. A circular portion 2 is utilized for the notations which are preferably placed in segments 3, 4, 5, 6, 7, 8, 9, 10, 11 and 12 as shown. A large segment 3, may, for example, be utilized for figures indicating the hours of the office day.

Other segments contain the notations—"Out of town"; "Gone for the day"; "At lunch"; "Phone me at ———"; or any other similar or appropriate notations suitable to the nature of the use for which the monitor is intended. Advertising material may be placed on other portions of the sheet.

The indicator 13 which cooperates with the notations is preferably circular and fastened to the sheet 1 by any appropriate means such as a hollow rivet 14 which is adapted to permit the indicator to be rotated. In accordance with the invention the indicator is sufficiently transparent to allow the notations to be easily read therethrough. Differentiation between a desired notation and the others is secured by providing a differentiating portion 15 in the indicator for registering with the desired notation. The differentiating portion may be an opening or a portion of different transparency than the remainder of the indicator. In the preferred arrangement shown by way of example, the indicator is of colored celluloid, for example, a thin sheet of transparent green colored celluloid. The colored celluloid by passing the green components of light more readily than others causes the segments thereunder to appear a different color than the segment registering with the opening 15 which is exposed. By this means marked differentiation is secured the significance of which is apparent to the observer. The user, however, can readily locate the desired notation without delay.

While I have shown an arrangement using a circular indicator and segments, my invention is not limited thereto as the shape of the indicator may be changed and the arrangement of the notations may be modified in appropriate well-known ways.

Having described my invention what I claim is:

1. A monitor comprising a sheet of stiff material, a pivot passing therethrough, said sheet having a plurality of notations around the pivot and an indicator covering the notations and rotatable on said pivot, said indicator consisting of a sheet of colored incompletely transparent material having an opening for exposing the desired notation whereby the notations under the colored material are visible but differentiated from the notation exposed by the opening.

2. A monitor comprising a sheet of colored material, said sheet having a plurality of notations arranged thereon, and an indicator covering the notations and having an opening therein for exposing part of the notations, said indicator being partially transparent and of the same color as said sheet, whereby light components of that color will be more readily passed, to cause the notations beneath the indicator to appear of a different color than the notation exposed at the opening in the indicator.

FRED H. KROGER.